Aug. 27, 1935.　　C. G. MUNTERS　　2,012,617
HEAT INSULATION
Filed Feb. 26, 1932
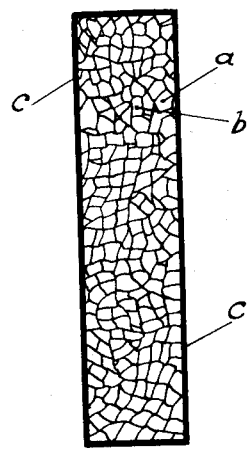
INVENTOR
Carl Georg Munters
BY
Cameron, Kerkam + Sutton
ATTORNEYS Patented Aug. 27, 1935

2,012,617

UNITED STATES PATENT OFFICE 2,012,617

HEAT INSULATION

Carl Georg Munters, Stockholm, Sweden

Application February 26, 1932, Serial No. 595,410
In Sweden March 3, 1931

16 Claims. (Cl. 49—77)

This invention relates to heat insulation and to methods of producing the same.

The object of the invention is to provide a heat insulating material of high quality adapted for use for any insulating purpose, such as for the insulation of refrigerating cabinets, rooms, boilers, or the like, and in the manufacture of insulating coverings for bottles or flasks, heat retaining cupboards, or the like.

It has been previously known that a good heat insulation may be obtained by applying the so-called Dewar principle which may be said to consist essentially in effecting an evacuated space between heat reflecting walls. The vacuum according to the "Dewar" principle is very high as any appreciable decrease in the heat conduction of air and other gases takes place only at such high vacuum. However, this principle has hitherto been applied in practice only to the insulation of relatively small vessels, as for instance so-called thermos bottles or the like, as in larger vessels the walls enclosing the Dewar space have not been capable, when constructed of moderate thickness, of resisting the atmospheric pressure acting on the same. The above-mentioned "Dewar" principle may in certain instances have been applied also to vessels of larger dimensions, as for instance to vessels for the conservation and transport of liquid air, but in such cases special constructions have been necessary of such a nature that they could be used only for the special purposes in question and could not be applied to insulating purposes in general as is the case with the insulating material according to the present invention. The present invention affords the possibility of providing an insulating material based on the high vacuum principle, which as regards its insulation capacity is superior to the insulating materials generally used and which is immediately applicable independently of the size and shape of the space to be insulated.

According to the main feature of the invention a metal is allowed to vaporize in a molten mass of glass, slag, or the like material, so as to form a great number of cells in the mass, the metal vapors being thereafter condensed so as to create a vacuum in said cells.

A comparison of the insulation of the present invention with the above described Dewar insulation shows that the disadvantages inherent in the latter insulation are eliminated by replacing the considerable vacuum chamber by a number of small evacuated closed cells or pores, the walls of which are formed by the mass. It will thus be obvious that the external bounding walls of the mass in the present case, if any, need not be so constructed as to withstand atmospheric pressure in the same manner as with the "Dewar" insulation, and the application of such insulation is therefore not limited to any particular shape. The insulation as a whole is not dependent on its external bounding walls and its insulation capacity will therefore not be considerably reduced if a part of said walls should become damaged due to impacts or the like.

The invention will be more fully described with reference to an embodiment of the same shown by way of example in the accompanying drawing, which illustrates diagrammatically an insulating material formed in the shape of a plate.

As shown in the figure the plate, which may consist of glass, slag, or the like has a large number of cells $a$ in which a high vacuum exists. By the term "high vacuum" or "highly evacuated" is to be understood a vacuum which is so high that the conductive capacity of the remaining gas is appreciably decreased. The cells are substantially separate from each other, that is to say they are individually hermetically closed. The cell walls $b$ are so dimensioned as to be capable of withstanding with safety the pressures acting on the outer walls of the plate but without permitting any considerable heat transfer by conduction through the same. Each cell or pore functions as a Dewar space, that is as a high vacuum insulating space. The material is formed with a great number of pores, preferably of small size, as in such case the resistance to heat transmission through the cell walls is increased on account of the irregular distribution of the cells.

The cells or pores in the mass are formed by means of metal vapors introduced in any suitable manner into the molten mass from which the insulation is to be produced. When the mass is cooled and solidified, these vapors are condensed and a high vacuum is obtained in the cells. The manufacture of such insulating material may for instance be effected by introducing into the molten mass of glass or slag a metal in a pulverulent state such as cadmium, zinc or the like, and intimately mixing it with the molten mass in accordance with the prevailing conditions. The mixing operation may take place at atmospheric pressure or at pressures differing therefrom. It is advantageous to use such fineness of the powder and to mix the same intimately with the molten mass to a very high degree so as to obtain an exceedingly intimate mixture. The cadmium or zinc in the molten mass is transformed into a gaseous state, the glass mass around the particles being thereby forced apart so as to form cells or pores. A cellular mass is thus obtained which is then permitted to cool or is positively cooled so as to solidify. The formation of the blebs filled with metal vapor in the mass may be effected or facilitated by exposing the above-mentioned mixture in its hot state to a falling pressure even as far as a high vacuum.

According to the structure desired, it may be advisable during the period of cooling or solidification to change the magnitude of the pressure or the vacuum. During manufacture care must be taken that the vacuum or the decrease in pressure, respectively, used in the formation of the insulation is so selected as to correspond to the vapor pressure of the substances by the evaporation of which the cells or pores are formed. During the period of solidification or cooling until the material has reached a state of rigidity, the mass should not be exposed to atmospheric pressure, but a vacuum should be maintained corresponding to the vapor pressure of the metal vapor filling the cells. This vapor pressure is a function of the temperature of the vapor, and under certain circumstances it may be advantageous, as the temperature and pressure of the vapor in the pores or cells decreases, to lower the pressure acting on the insulation correspondingly. The cellular plate thus formed, depending upon its purpose or use, may be provided with solid outer surfaces or walls c of a strength sufficient to resist external strains. For instance a plate having a somewhat greater thickness than that desired for the finished plate may be formed during the vacuum process, the external walls being subsequently formed by melting the outer surfaces of the cellular plate obtained during the period of vacuum or reduced pressure. The bounding surfaces of the plate may also be formed in other ways, for example, directly during the vacuum process, by carrying said process out in containers or like devices of a shape corresponding to that of the finished plate, or by dipping the plate into a molten mass of suitable glass.

The metal used for the formation of the pores or cells may preferably be of a kind so as to condense and deposit on the cell walls during the solidification or cooling of the mass, forming on the same a more or less heat reflecting layer. This may be effected by using for instance zinc as such cell forming substance.

It may be possible, in certain cases, to manufacture the insulating material according to the invention from porcelain, faience or other materials having low heat conductibility.

It is evident from the above description that, for the production of the insulation according to the invention, a material should be used in which cells separated by extremely thin walls, say 0.1 mm. or less, may be formed and which have a low heat conductivity and which at the same time gives a rigid structure of sufficient strength to counteract the atmospheric pressure on the walls of the insulation elements. The temperatures and the pressures to be used when producing the mass are to be chosen according to the materials used.

It may be pointed out that after mixing the powder, for instance zinc or cadmium, with the molten mass, for instance glass, it is in certain cases advantageous to allow the mixture to be cooled down to such extent that a viscous mass is obtained but which is suitable for forming the cells when the powder evaporates due to the following decrease of the pressure acting on the molten mass.

What I claim is:

1. Method of producing a heat insulation consisting in mixing a substance such as zinc, cadmium or the like, preferably in the form of powder, into a mass, consisting for instance of glass, heating the mixture to the melting temperature of the mass, lowering the pressure to permit said substance to evaporate thereby forming numerous cells or pores in the mixture, and cooling the mass under vacuum.

2. A method of making heat insulation which includes the steps of producing a fused mass of a substance such as glass, slag or the like with a metal mixed therein, reducing the pressure thereon whereby said metal vaporizes and expands said mass to form a relatively large number of cells separated by relatively thin walls, and then solidifying said mass while retaining the cellular construction provided by said expansion of the mass.

3. A method of making heat insulation which includes the steps of producing a fused mass of a substance such as glass, slag or the like with a metal mixed therein, reducing the pressure thereon whereby said metal is vaporized and said mass expanded to produce a relatively great number of small cells each of which is under relatively low internal gas pressure, and then solidifying the mass under reduced pressure to retain the cellular structure so produced.

4. A method of making heat insulation which includes the steps of producing a fused mixture of a substance such as glass, slag or the like and a metal, subjecting said mass to temperature and pressure conditions which will cause the vaporization of said metal whereby said mass is converted into a cellular structure composed of a relatively large number of cells separated by relatively thin walls and under a low internal gas pressure, and then solidifying said mass in said last named condition.

5. A method of making heat insulation which includes the steps of fusing a vitreous mass, mixing said mass with a metal, vaporizing the metal so as to form cells in the mass, and cooling the mass to condense said vapors and to create a vacuum in the cells.

6. A method of making heat insulation which includes the steps of fusing a vitreous mass, mixing said mass with a metal, vaporizing the metal by reducing the pressure on the mixture so as to form cells in the mass, and cooling the mass to condense said vapors and to create a vacuum in the cells.

7. A method of making heat insulation which includes the steps of fusing a vitreous mass, mixing said mass with a metal, vaporizing the metal so as to form cells in the mass, and cooling the mass under a vacuum to condense said vapors and to create a vacuum in the cells.

8. A method of making heat insulation which includes the steps of vaporizing a metal in a molten vitreous mass to form cells therein, and cooling the mass while retaining its cellular form to condense the vapors in the cells and create a vacuum therein.

9. A method of making heat insulation which includes the steps of subjecting a molten vitreous mass to metallic vapors to expand the same into a cellular mass, and solidifying the mass and condensing the vapors in the cells to form a vacuum therein.

10. A method of making heat insulation which includes the steps of subjecting a molten vitreous mass containing metal to a reduction in pressure to vaporize the metal and form a cellular mass, and cooling the mass under reduced pressure to retain the cellular form and condense the gases in the cells.

11. The method which consists in melting a vitreous material, mixing it with a metal, agitating the mixture and producing a foam, and cooling the foam, causing it to solidify and causing the intermixed metal to condense.

12. As an article of manufacture, a refractory cellular material, the cells of which contain condensed metal occupying only a minute fraction of the cell chambers.

13. As an article of manufacture, a block of vitreous material cellular throughout its structure, the cells containing a substantial vacuum and a metal which is in condensed form at atmospheric temperatures.

14. An insulating material comprising a vitreous base in the form of a foam, and a condensed metal within the cells of said material.

15. A glass foam having condensed metal within its cells.

16. A refractory insulating material comprising a vitreous cellular base, the cells of which contain a non-vitreous material which throughout the range of atmospheric temperatures is in the form of a solid and occupies a small fraction only of the cell chambers.

CARL GEORG MUNTERS.